(12) United States Patent
Koyama

(10) Patent No.: US 9,477,143 B2
(45) Date of Patent: Oct. 25, 2016

(54) CAMERA DEVICE

(71) Applicant: Terunori Koyama, Kanagawa (JP)

(72) Inventor: Terunori Koyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/979,694

(22) Filed: Dec. 28, 2015

(65) Prior Publication Data

US 2016/0195799 A1    Jul. 7, 2016

(30) Foreign Application Priority Data

Jan. 7, 2015    (JP) .................... 2015-001722

(51) Int. Cl.
| | | |
|---|---|---|
| G03B 17/00 | (2006.01) | |
| G03B 17/56 | (2006.01) | |
| G03B 17/02 | (2006.01) | |
| H04N 5/225 | (2006.01) | |
| G03B 35/08 | (2006.01) | |
| H04N 13/02 | (2006.01) | |

(52) U.S. Cl.
CPC ............ G03B 17/561 (2013.01); G03B 17/02 (2013.01); H04N 5/2253 (2013.01); H04N 5/2258 (2013.01); G03B 35/08 (2013.01); H04N 13/0239 (2013.01)

(58) Field of Classification Search
CPC .... G03B 17/561; G03B 35/00; G03B 35/08; H04N 5/2253; H04N 5/2258; H04N 13/0239
See application file for complete search history.

(56) References Cited

U.S. PATENT DOCUMENTS

| | | | | |
|---|---|---|---|---|
| 4,879,596 A * | 11/1989 | Miura | .................... | G03B 35/08 348/373 |
| 2006/0039687 A1* | 2/2006 | Yang | ...................... | F16M 11/10 396/20 |
| 2006/0209192 A1 | 9/2006 | Shinohara et al. | | |
| 2008/0007847 A1 | 1/2008 | Koyama | | |
| 2008/0291556 A1 | 11/2008 | Koyama | | |
| 2009/0268013 A1* | 10/2009 | Katahira | ................ | G03B 35/08 348/46 |
| 2010/0247092 A1 | 9/2010 | Koyama | | |
| 2011/0050855 A1* | 3/2011 | Nobis | .................. | G01B 5/0025 348/47 |
| 2011/0194852 A1 | 8/2011 | Koyama | | |
| 2012/0086784 A1* | 4/2012 | Oh | ........................ | H04N 5/2251 348/47 |
| 2012/0229923 A1 | 9/2012 | Koyama | | |
| 2013/0002973 A1* | 1/2013 | Chen | ........................ | G02B 3/14 349/15 |
| 2013/0088578 A1 | 4/2013 | Umezawa et al. | | |
| 2013/0088791 A1 | 4/2013 | Iwasaki et al. | | |
| 2013/0265394 A1* | 10/2013 | Lim | ..................... | H04N 5/2253 348/46 |
| 2014/0247390 A1* | 9/2014 | Ohsumi | .................. | B60R 11/04 348/373 |
| 2014/0347753 A1 | 11/2014 | Terahara et al. | | |
| 2015/0029313 A1* | 1/2015 | Muller | ................. | H04N 5/2251 348/47 |
| 2015/0158435 A1* | 6/2015 | Ohsumi | .................. | G01C 3/18 348/375 |
| 2015/0358605 A1* | 12/2015 | Muller | ................. | H04N 5/2253 348/47 |
| 2016/0006911 A1* | 1/2016 | Kimura | ................ | H04N 5/2253 348/47 |

FOREIGN PATENT DOCUMENTS

| | | | |
|---|---|---|---|
| JP | 2004-82829 | 3/2004 | |
| JP | 2006-91177 | 4/2006 | |
| JP | 2011-102942 | 5/2011 | |
| JP | 2013-93013 | 5/2013 | |
| JP | 2014-204383 | 10/2014 | |
| WO | WO 2007/009744 A1 * | 8/2007 | ........... G03B 17/561 |

* cited by examiner

*Primary Examiner* — WB Perkey
(74) *Attorney, Agent, or Firm* — Oblon, McClelland, Maier & Neustadt, L.L.P.

(57) ABSTRACT

A camera device includes a holding member that holds a plurality of cameras to be arranged side by side, a supporting member that supports the holding member, a first positioner that positions the holding member to the supporting member in an arranged direction of the cameras, and a second positioner that positions the holding member to the supporting member in optical axis directions of the cameras, the second positioner being movable in the arranged direction of the cameras. The first positioner and the second positioner are arranged in the arranged direction of the cameras.

15 Claims, 10 Drawing Sheets

CAMERA DEVICE

CROSS-REFERENCE TO RELATED APPLICATION

This application is based upon and claims the benefit of priority to Japanese Patent Application No. 2015-1722 filed on Jan. 7, 2015, the entire disclosures of which are incorporated herein by reference.

BACKGROUND

1. Technical Field

The present invention relates to a camera device including a plurality of cameras.

2. Description of Related Art

A camera device in which a stay or holding member that supports a pair of cameras is provided in a casing is conventionally known (for example, see JP2006-91177A).

The camera device has a structure in which a plate-shaped spring is screwed to a boss provided on a central portion of a rear cover of the casing, the satay is fixed to the plate-shaped spring by screws, and a pair of cameras is provided on the stay. In addition, a stud provided on a back surface of a front cover abuts with a tongue piece of the stay. In the camera device, a direction of the stay is configured to be adjusted by adjusting a screw threaded in a threaded hole provided in the stud.

However, in such a camera device, when a supporting member which is the front cover is deformed by an external force or heat (external factor) and so on, there is a possibility that the holding member or the stay is deformed by a degree of the deformation of the supporting member.

SUMMARY

An object of the present invention is to provide a camera device capable of preventing the holding member from being deformed by the external factor.

To accomplish the above object, a camera device according to an embodiment of the present invention includes a holding member that holds a plurality of cameras to be arranged side by side, a supporting member that supports the holding member, a first positioner that positions the holding member to the supporting member in an arranged direction of the cameras, and a second positioner that positions the holding member to the supporting member in optical axis directions of the cameras, the second positioner being movable in the arranged direction of the cameras. The first positioner and the second positioner are arranged in the arranged direction of the cameras.

DETAILED DESCRIPTION OF EMBODIMENTS

Embodiments according to the present invention will be described hereinafter with reference to the accompanying drawings.

First Embodiment

Figure 1:
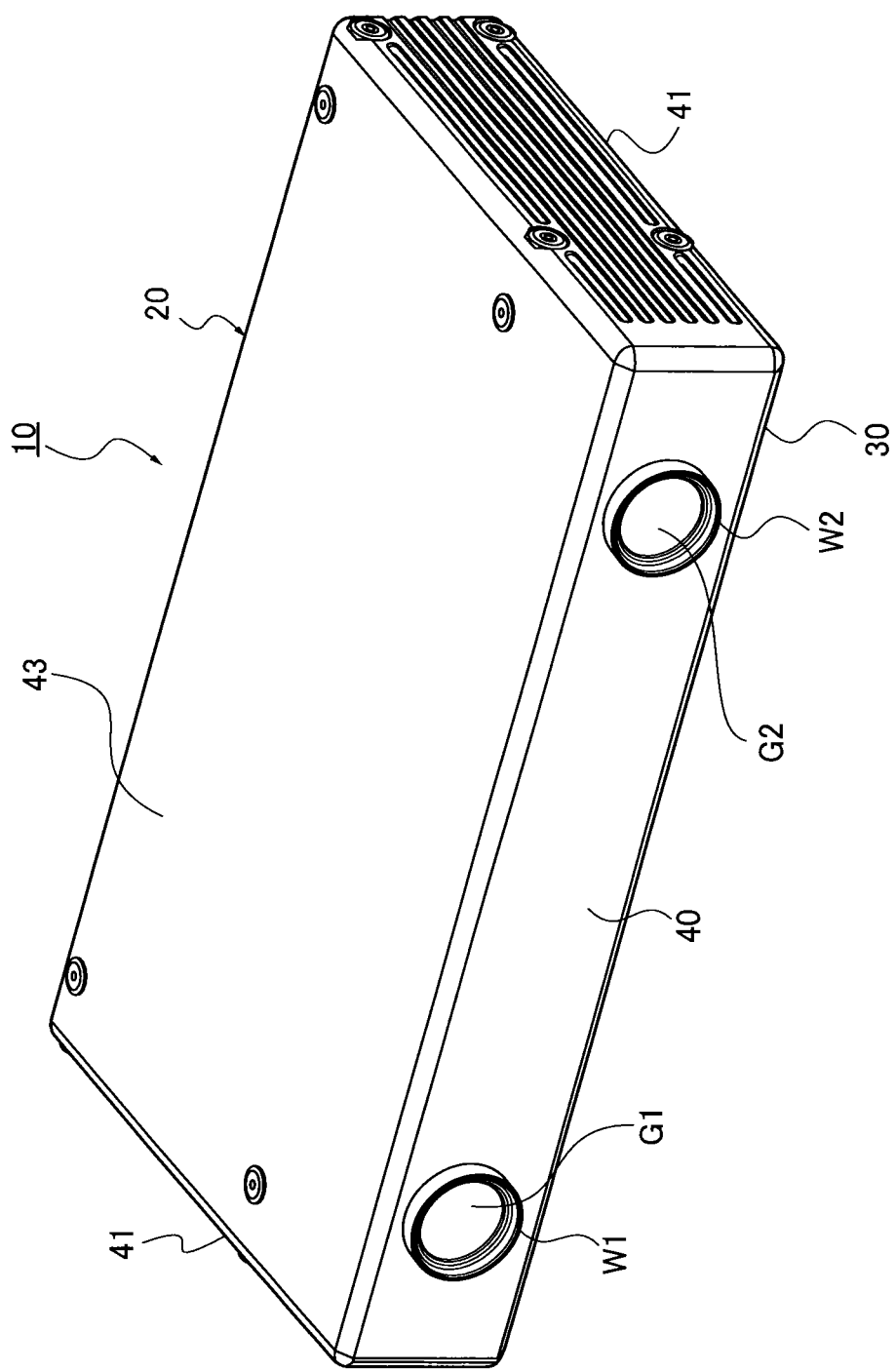
FIG. 1 is a perspective view showing an appearance of a camera device according to a first embodiment of the present invention.
Figure 2:
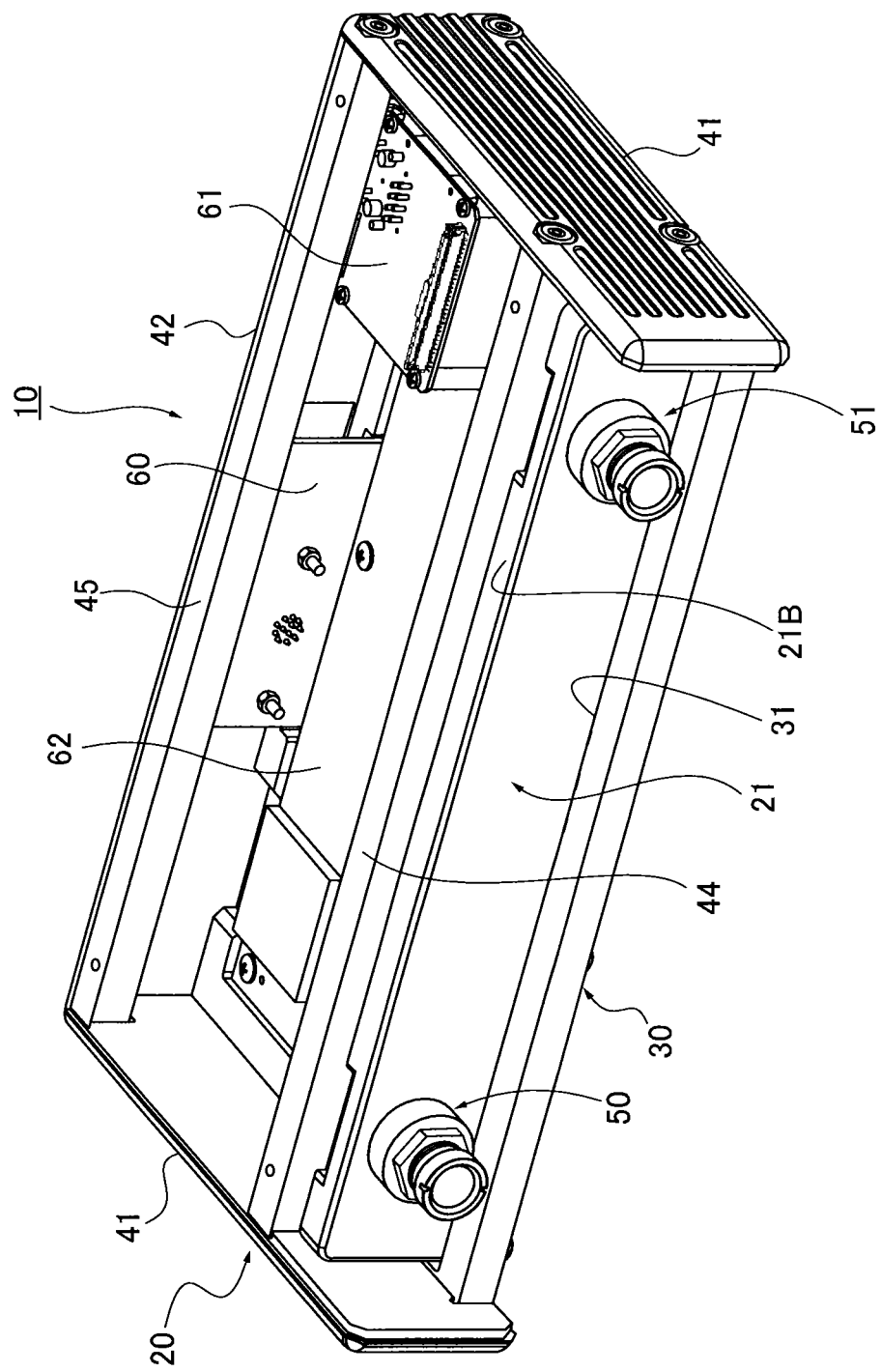
FIG. 2 is a perspective view of the camera device shown in FIG. 1 in which a top plate and a front plate are omitted.

FIG. 1 illustrates an outside appearance of a camera device 10. The camera device 10 include a casing 20, a holding member 21 provided in the casing 20, a pair of cameras 50, 51 mounted on the holding member 21, and a supporting member 30 that supports the holding member 21, as shown in FIGS. 1 and 2. The casing 20 has, for example, a rectangular shape in a vertical section and is made of, for example, an aluminum material. The supporting member 30 has a rectangular shape. A substrate 60 for a power source, a substrate 61 for communication, and a circuit substrate 62 for arithmetic processing are provided in the casing 20 (see FIG. 2).

In the first embodiment, the holding member 21 mounting the cameras 50, 51 thereon is disposed on a front portion of the casing 20, and the supporting member 30 is disposed on a bottom portion of the casing 20. A top plate 43 is attached to a top portion of the casing 20. The cameras 50 and 51 are mounted on the holding member 21 to be arranged in a horizontal direction of the casing as viewed from FIG. 1, in other words, a right and left direction. Note that it is not necessary to take a care of "do not turn them upside down" with respect to the cameras, but the supporting member 30 is referred to as a bottom plate facing the top plate 43 for convenience of explanation, as describe below.

As a result, the casing 20 includes the bottom plate 30, a front plate 40 provided at a front end of the bottom plate 30 to cover the bottom plate 30, side plates 41, 41 disposed at right and left both sides of the casing 20, a rear plate 42, and the top plate 43. Each of the bottom plate 30 and the top plate 43 constitutes a part of the casing 20. The top plate 43 is provided on an opposite side to the bottom plate 30 of the casing 20 to form a cover portion of the casing 20.

The casing 20 is reinforced by providing a first lateral bridging member 44 disposed parallel to the holding member 21 and providing a second lateral bridging member 45 along the rear plate 42, as shown in FIG. 2. Each of the first and second lateral bridging members 44 and 45 is made of, for example, an aluminum material.

Figure 3:
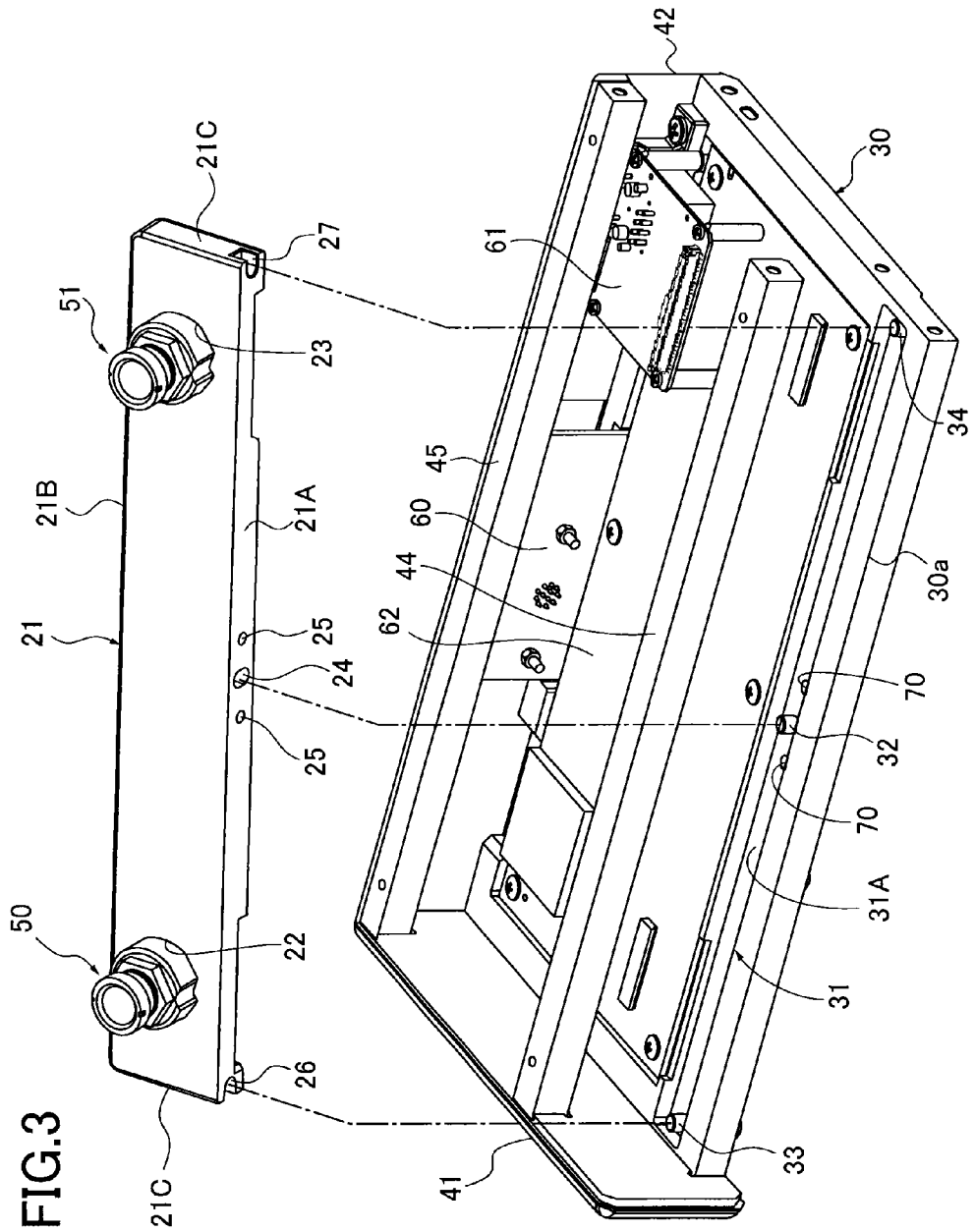
FIG. 3 is a perspective view of the camera device shown in FIG. 2 in which one side plate is omitted and a holding member is removed.
Figure 4:
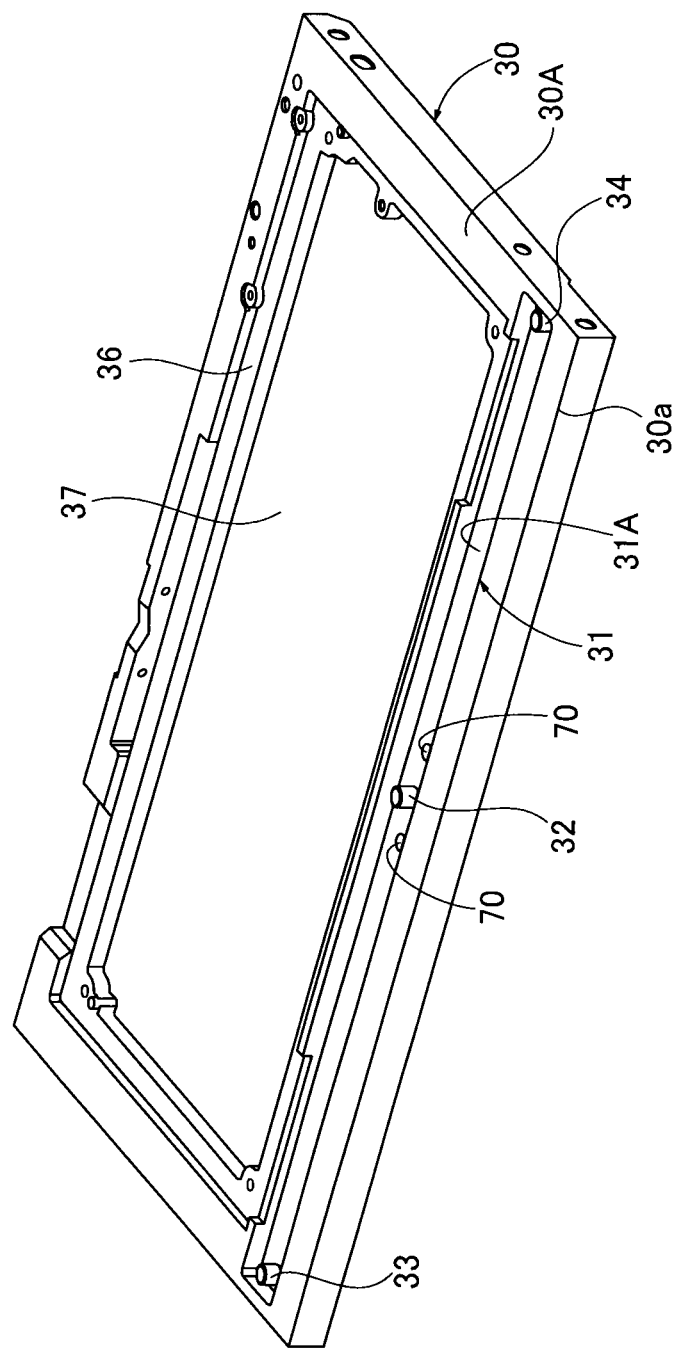
FIG. 4 is a perspective view showing a bottom plate of the camera device shown in FIG. 1.

The front plate 40 has windows W1 and W2 arranged to face the right and left cameras 50 and 51, respectively. Cover glasses G1 and G2 are provided on the windows W1 and W2. As shown in FIGS. 3 and 4, the bottom plate 30 has a groove 31 or joint portion provided at an upper surface 30A of the bottom plate 30 to extend in a longitudinal direction along a front edge 30a of the bottom plate 30. A circular boss or first boss 32 is provided in a central portion of the groove 31 and configured to project upward from a bottom surface 31A of the groove 31. The first boss 32 has a height set to be the same as a depth of the groove 31. Through-holes 70, 70 are provided in the bottom surface 31A of the groove 31 and arranged to sandwich the first boss 32 from right and left both sides thereof (see FIG. 3).

Circular second bosses 33 and 34 are provided on positions close to both end portions of the groove 31 and configured to project upward from the bottom surface 31A of the groove 31. Each of the second bosses 33 and 34 has a height set to be slightly lower than that of the first boss 32.

A step portion 36 and a concave portion 37 to attach the substrate 61 for communication thereto are provided in the upper surface 30A of the bottom plate 30 on a rearward of the groove 31, as shown in FIG. 4.

Figure 5:
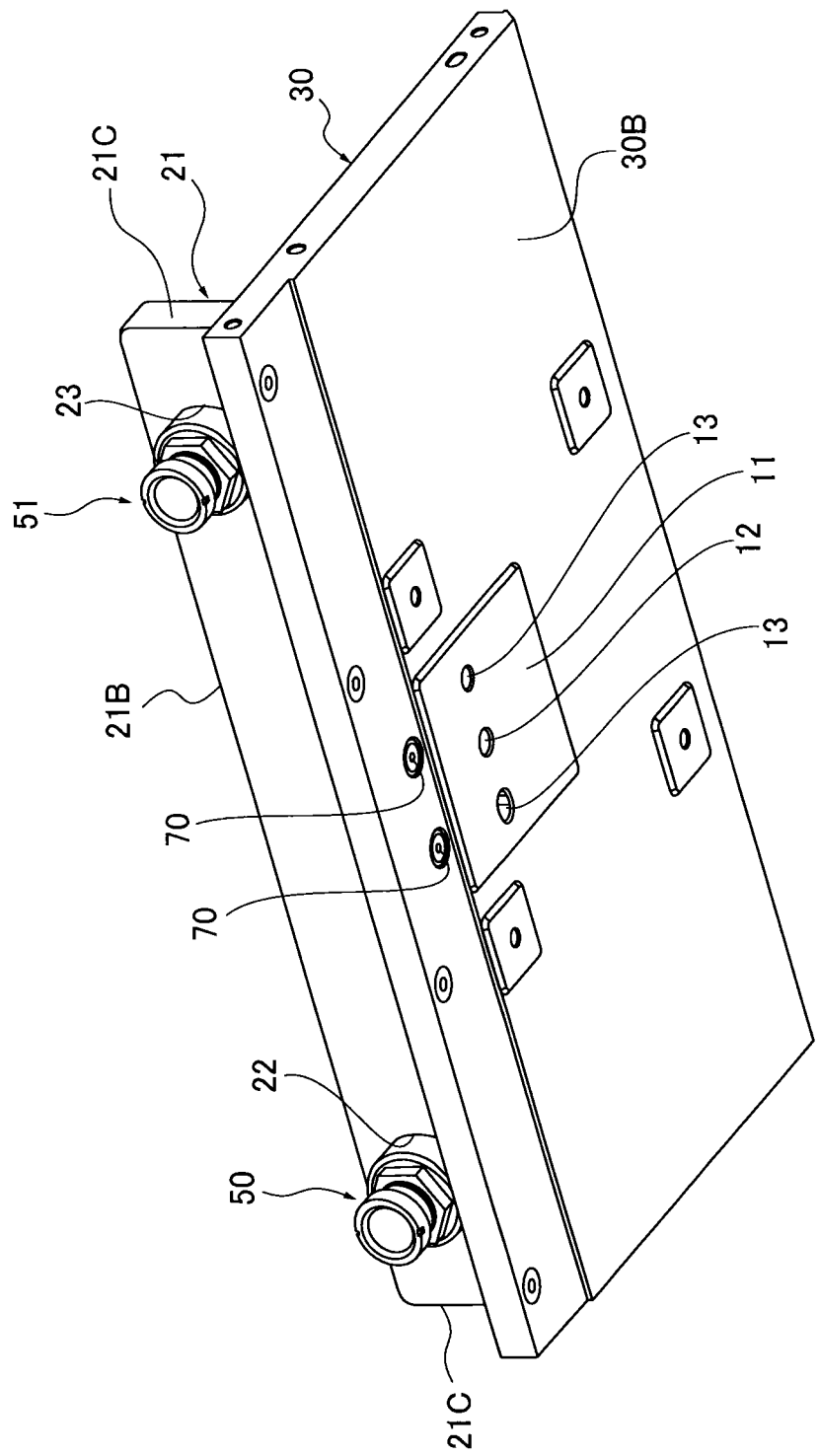
FIG. 5 is a perspective view showing a state where the holding member is mounted on the bottom plate shown in FIG. 4 and the bottom plate as viewed from below.

A fastening section 11 to fasten the camera device 10 (see FIG. 1) to a predetermined holding plate (not shown) is provided on a lower surface 30B of the bottom plate 30, as shown in FIG. 5. The fastening section 11 has a boss hole 12, and two threaded holes 13. A boss (not shown) provided on the holding plate is inserted in the boss hole 12.

Figure 6:
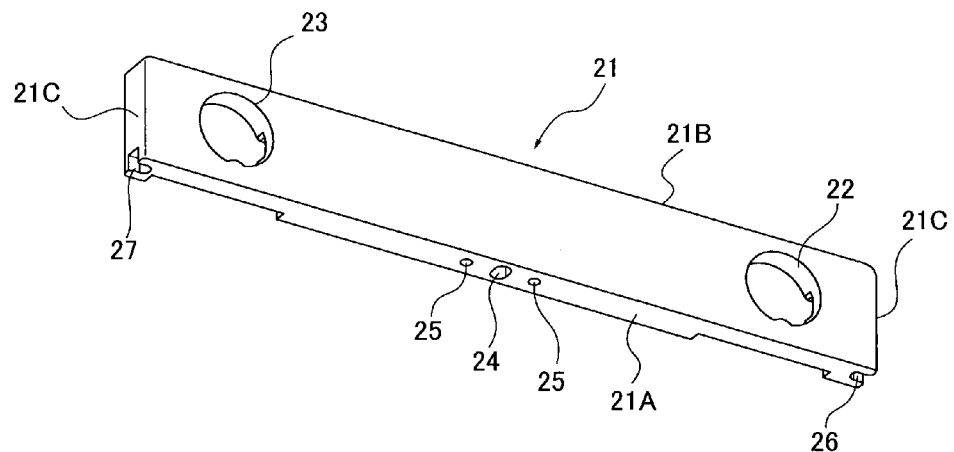
FIG. 6 is a perspective view showing the holding member as viewed from rear.
Figure 7:
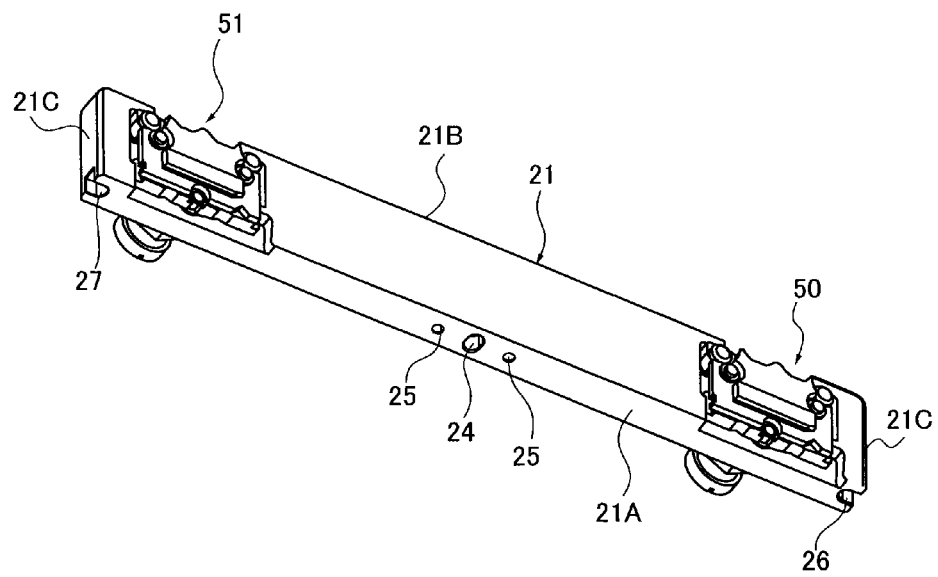
FIG. 7 is an explanatory view showing the holding member shown in FIG. 6 to which cameras are mounted.

As shown in FIGS. 3 and 6, the holding member 21 has a shape formed to be long in an arranged direction of the cameras 50, 51, and circular openings 22 and 23 provided on right and left both sides thereof. The pair of cameras 50 and 51 is fitted and held in the openings 22 and 23, respectively, as shown in FIGS. 3 and 7. Here, the cameras 50 and 51 are configured to perform a stereo photograph. Each of the cameras 50 and 51 has an imaging optical system (not shown) to image a subject and an imaging element that receives an image of the subject imaged by the imaging optical system.

As shown in FIGS. 6 and 7, a first hole 24 is provided in a central portion of a lower surface (joint surface) 21A of the holding member 21. In addition, threaded holes 25, 25 are provided in the lower surface at both sides of the first hole 24. Here, the threaded holes 25, 25 are preferably provided at positions close to the first hole 24. The first hole 24 is configured to form a long hole having a long diameter in a direction (an optical axis direction of each of the cameras: forward and rearward direction) perpendicular to a longitudinal direction (arranged direction of the cameras) of the holding member 21.

Figure 9:
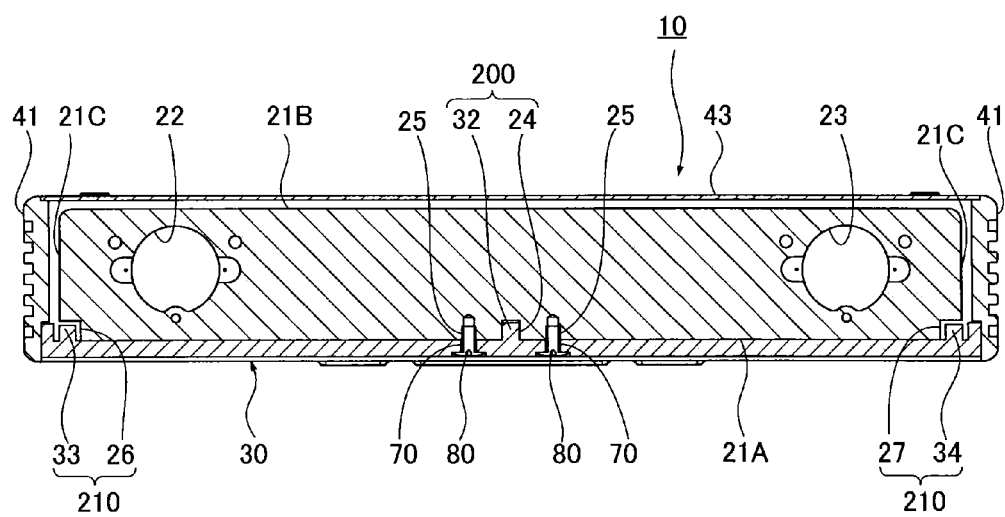
FIG. 9 is a sectional view showing a structure in which the holding member is mounted on the bottom plate of the casing.

The threaded holes 25, 25 of the holding member 21 and the through-holes 70, 70 of the bottom plate 30 operate to fasten the holding member 21 to the bottom plate 30 by screws (fastening members) 80, 80 (see FIG. 9). Here, if the holding member 21 can be fully fastened to the bottom plate 30, one threaded hole 25 and one fastening member may be used.

As shown in FIGS. 6 and 7, second holes 26, 27 are provided in both end portions of the lower surface 21A of the holding member 21. Each of the second holes 26, 27 is configured to have a long diameter extending in the longitudinal direction of the holding member 21. The second bosses 33, 34 of the bottom plate 30 are inserted in the second holes 26, 27, respectively. An outer end of each of the long holes, in other words, a portion of each hole at an outer end of the holding member 21 is opened. The second holes 26, 27 are configured such that the second bosses 33, 34 are movable in the second holes 26, 27 in a direction of the long diameter.

Figure 8:
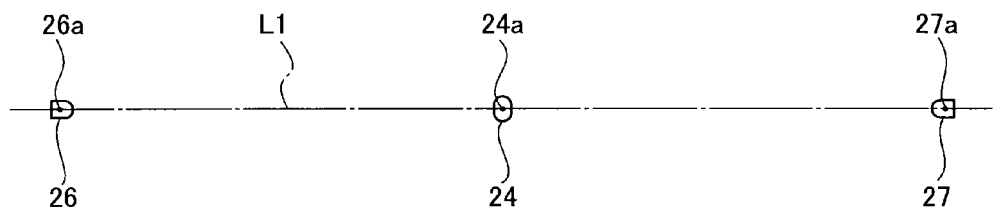
FIG. 8 is an explanatory view showing a position relationship among a first hole of the holding member and second holes of the holding member.

A depth of the first hole 24 and a depth of each of the second holes 26, 27 are set to be deeper than a height of each of the first boss 32 and the second bosses 33, 34 of the bottom plate 30, respectively. The first hole 24 and the second holes 26, 27 are configured such that a central position 24a of the first hole 24 and central positions 26a, 27a of the second holes 26, 27 are positioned on a straight line L1, as shown in FIG. 8.

A first positioner 200 is configured to position the holding member 21 to the supporting member or the bottom plate 30 in an arranged direction of the cameras 50, 51, and a second positioner 210 is configured to position the holding member 21 to the supporting member 30 in the optical axis directions of the cameras 50, 51. In the illustrated embodiment, the first positioner 200 is disposed in a central portion of the holding member 21, and the second positioner 210 is disposed at both ends of the holding member 21. The first positioner 200 is formed by the first hole 24 and the first boss 32 inserted in the first hole 24. The second positioner 210 includes a first positioning mechanism in which the second boss 33 is inserted in the second hole 26 and a second positioning mechanism in which the second boss 34 is inserted in the second hole 27 (see FIG. 9). The first positioner 200 and the second positioner 210 are arranged along the arranged direction of the cameras 50, 51.

In other words, the first positioner 200 is configured to be movable the holding member 21 relative to the bottom plate 30 in a parallel direction (direction perpendicular to the arranged direction of the cameras) with the optical axis of each of the cameras 50, 51.

The second positioner 210 is configured to be movable the holding member 21 relative to the bottom plate 30 in the arranged direction of the cameras 50, 51.

The holding member 21 has a height and a length in the longitudinal direction set such that the upper surface 21B of the holding member 21 does not come into contact with the top plate 43 and both end surfaces 21C of the holding member 21 do not come into contact with the side plates 41, in other words, in a manner of non-contact in each case.

Next, an assembly of the camera device 10 configured as described above is briefly described. First, the cameras 50, 51 are previously fitted in the openings 22, 23 of the holding member 21, respectively, as shown in FIGS. 3 and 7. The optical axis of each of the cameras 50, 51 is adjusted to be directed to a predetermined direction.

Next, the rear plate 42 on which the side plates 41, 41 and the substrate 60 for power source are assembled is mounted on the bottom plate 30 on which the substrate 61 for communication and the circuit substrate 62 for arithmetic processing are assembled, and the first and second lateral bridging members 44, 45 are assembled so as to be disposed between the side plates 41, 41.

Figure 10:
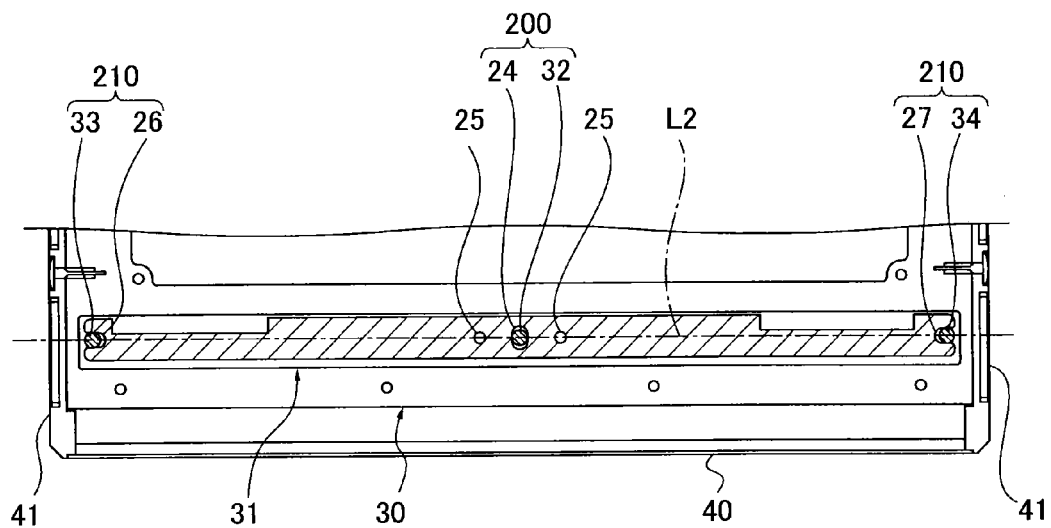
FIG. 10 is a plan view with a part sectioned, showing the structure in which the holding member is mounted on the bottom plate of the casing.

As shown in FIG. 3, the first boss 32 of the bottom plate 30 is inserted in the first hole 24 provided in the lower surface 21A of the holding member 21 on which the cameras 50, 51 are mounted, and the second bosses 33, 34 of the bottom plate 30 are inserted in the second holes 26, 27 of the holding member 21. Thereby, as shown in FIGS. 2 and 10, the holding member 21 is fitted in the groove 31 of the bottom plate 30. Subsequently, the holding member 21 is fastened to the bottom plate 30 by threading the screws 80, 80 in the threaded holes 25, 25 of the holding member 21 passing through the through-holes 70, 70 of the bottom plate 30, as shown in FIG. 9. Thereafter, the front plate 40 and the top plate 43 are assembled.

Here, the assembly sequence of the camera device is not limited to the above. For example, after the holding member 21 is assembled to the bottom plate 30, the side plates 41, 41 and the rear plate 42 are assembled, and thereafter the first and second lateral bridging members 44, 45 and the front plate 40 and the top plate 43 may be assembled.

After the assembly of the camera device 10 is completed, the assembled camera device 10 is fastened to the predetermined holding plate through the fastening section 11 attached to the lower surface 30B of the bottom plate 30. More specifically, the camera device 10 is attached to the holding plate by inserting the boss of the holding plate in the boss hole 12 and threading screws in the threaded holes 13, 13 of the holding plate.

Here, the holding member 21 is positioned rightward and leftward by fitting the first boss 32 in the first hole 24 which is the long hole and positioned forward and rearward by inserting the second bosses 33, 34 in the second holes 26, 27, respectively. Therefore, it is possible to accurately execute the positioning of the central position between the cameras 50 and 51 and accurately direct the optical axis of each of the cameras 50, 51 in a predetermined direction. Further, since the holding member 21 is fixed not to move rightward and leftward, the holding member 21 is thermally expanded in a symmetrical manner rightward and leftward around the position of the boss 32. As a result, it is possible to securely hold the central position between the cameras 50, 51.

Figure 11:
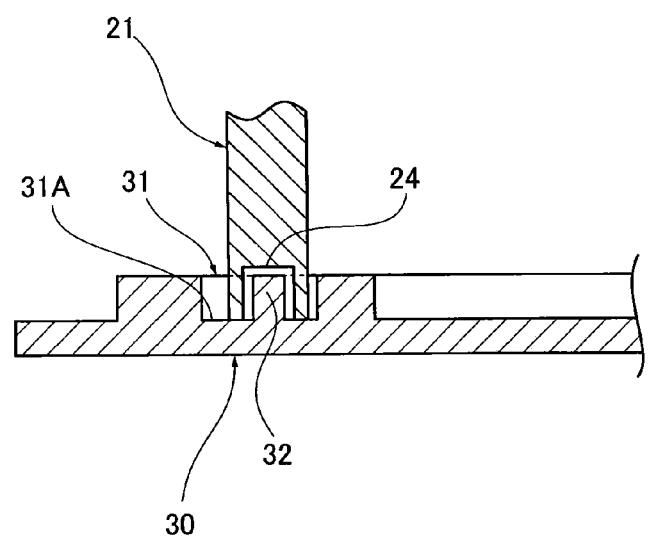
FIG. 11 is an enlarged sectional view of a part of a state where first and second bosses of the bottom plate are inserted in the first hole and the second holes of the holding member, respectively.

As shown in FIG. 8, the first hole 24 and the second holes 26, 27 are arranged in a straight line. Therefore, even if the position of the first boss 32 deviates forward and rearward from a straight line L2 connecting the first boss 32 and the second boss 34, as shown in FIG. 10, because the first hole 24 has a diameter to be long forward and rearward, as shown in FIGS. 10 and 11, it is possible to absorb a position deviation of the first boss 32.

As a result, it is possible to securely assemble the holding member 21 even if the position of the boss deviates forward and rearward, and to accurately set the position and the direction of the optical axis of each of the cameras 50, 51 based on the straight line L2.

There is a case where the bottom plate 30 is thermally expanded to the holding member 21 in the longitudinal direction of the holding member 21 by heat of a semiconductor of the circuit substrate 62 for arithmetic processing, or the holding member 21 is thermally expanded to the bottom plate 30 by environment temperature. In such a case, the second bosses 33, 34 of the bottom plate 30 are relatively moved in the second holes 26, 27 of the holding member 21 in the longitudinal direction of the holding member 21. Since each of the second holes 26, 27 has the long diameter in the longitudinal direction of the holding member 21, the second bosses 33, 34 are relatively moved in the second holes 26, 27. Thereby, the holding member 21 is prevented from being deformed by the thermal expansion of the bottom plate 30 or the holding member 21. That is to say, the holding member 21 is prevented from being deformed by an external factor such as temperature.

Therefore, the direction of the optical axis of each of the cameras 50, 51 is prevented from being changed and the center position between the cameras 50 and 51, in other words, the center position between the optical axes is prevented from being changed, by the thermal expansion of the holding member 21 or the bottom plate 30.

The holding member 21 is fastened by the screws 80, 80, as shown in FIG. 9. However, since the fastened positions are disposed close to the first boss 32 that fixes rightward and leftward the holding member 21, the fastening is not affected by thermal expansion. The holding member 21 fastened by the screws 80, 80 is prevented from bring deformed by the thermal expansion of the holding member 21 or the bottom plate 30.

The length of holding member 21 and the width (rightward and leftward distance) of the casing 20 can be reduced because side portions of the second holes 26, and 27 are opened, thereby accomplishing downsizing and lighting of the camera device 10.

Furthermore, because the fastening section 11 to fasten the camera device 10 to the predetermined holding plate is provided on the lower surface 30B of the bottom plate 30, it is possible to minimize a building up error from the fastening section 11 to the holding member 21 due to thermal expansion.

In addition, the holding member 21 is rigidly fixed to the bottom plate 30. The holding member is, therefore, prevented from being deformed by an external force (external factor). Furthermore, as shown in FIG. 9, since the upper surface 21B and the both end surfaces 21C of the holding member 21 do not come into contact with the top plate 43 and the side plates 41, respectively, the holding member 21 is hard to receive influences such as an external force or thermal deformation from the top plate 43 or the side plates 41, thereby the holding member 21 is further prevented from being deformed by an external factor.

Second Embodiment

Figure 12:
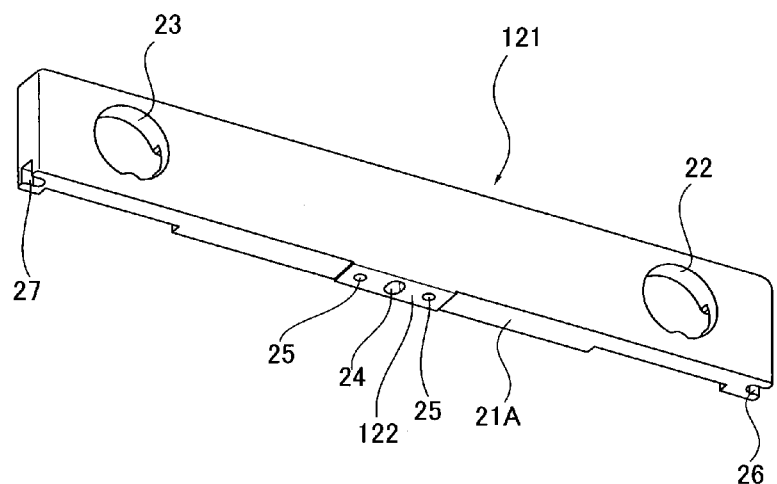
FIG. 12 is a perspective view showing a holding member according a second embodiment.

FIG. 12 illustrates a holding member 121 according to a second embodiment. The holding member 121 has a step portion 122 provided on a central portion of the lower surface 21A to protrude slightly from the lower surface 21A. The first hole 24 and the threaded holes 25, 25 arranged at both sides of the first hole 24 are provided in the step portion 122.

Figure 13:
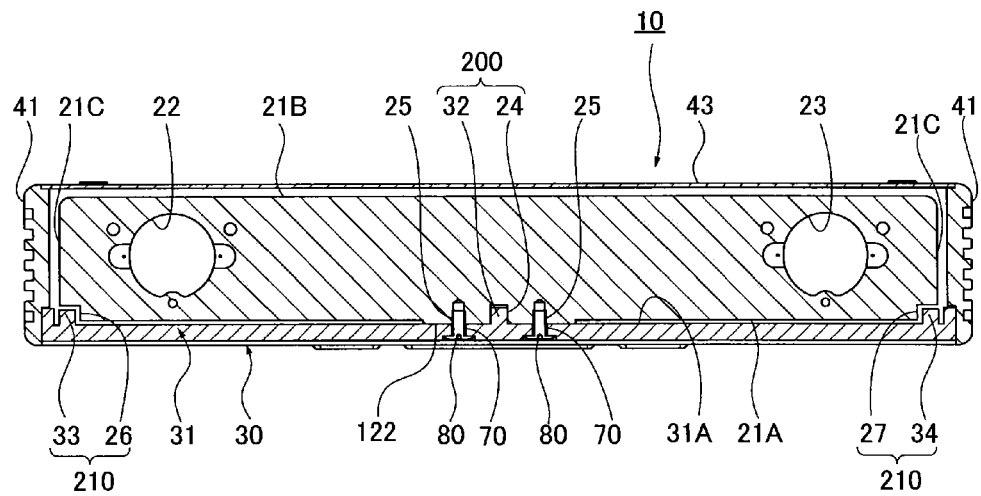
FIG. 13 is a sectional view showing a structure in which the holding member of the second embodiment is mounted on the bottom plate of the casing.

When the holding member 121 is mounted on the bottom plate 30, as shown in FIG. 13, the step portion 122 is fitted in the groove 31 of the bottom plate 30 and a top surface of the step portion 122 abuts with the bottom surface 31A of the groove 31. At this time, only the step portion 122, in other words, only the central portion of the lower surface 21A of the holding member 121 is in contact with the bottom surface 31A of the groove 31. Therefore, the lower surface 21A at the both sides of the step portion 122 of the holding member 121 is disposed in a state slightly raised from the upper surface 30A of the bottom plate 30. Thereby, the influence on the holding member by deformation of the bottom plate 30 in the upward and downward direction can be reduced.

In the embodiments as described above, the first hole 24 and the second holes 26, 27 are provided in the lower surface 21A of the holding member 21, 121, which is one of joint surfaces of the holding member and the bottom plate, and the first boss 32 and the second bosses 33, 34 are provided on the bottom surface 31A of the groove 31 of the bottom plate 30, which is the other of the joint surfaces. However, reversely, the first hole 24 and the second holes 26, 27 may be provided in the bottom surface 31A of the groove 31 of the bottom plate 30, and the first boss 32 and the second bosses 33, 34 may be provided on the lower surface 21A of the holding member 21. The second holes 26, 27 which are the long holes are provided in the both ends of the holding member 21. However, one long hole 26 or 27 and one boss 33 or 34 inserted in the one long hole may be provided.

In addition, the first boss 32 and the first hole 24 are omitted and either one of the second holes 26, 27 is formed in a circular hole, and the rightward and leftward positioning of the holding member 21 may be accomplished. In this case, it is possible to correctly set the direction of each of the optical axes of the cameras 50, 51 based on the straight line L2 (FIG. 10) as the reference. The position of each optical axis can be correctly amended and obtained based on a temperature and a coefficient of thermal expansion of the holding member 21. Here, the first positioner 200 is composed of the first hole 24 and the first boss 32 inserted in the first hole 24. The second positioner 210 is composed of the second holes 26, 27 and the second bosses 33 and 34 inserted in the second holes 26, 27, respectively. The first positioner 200 positions the holding member 21 in the arranged direction of the cameras 50, 51 and the second positioner 210 positions the holding member 21 in the optical axis directions of the cameras 50, 51. In addition, the first and second positioners 200 and 210 are configured to fix the holding member 21 to the bottom plate 30.

In the foregoing embodiments, the holding member 21 and the casing 20 are made of aluminum of the same material, but may be made of different materials from each other or any material without being limited to the same material. For example, the holding member 21 may be made of a super invar and the casing 20 may be formed by die casting.

Figure 14:
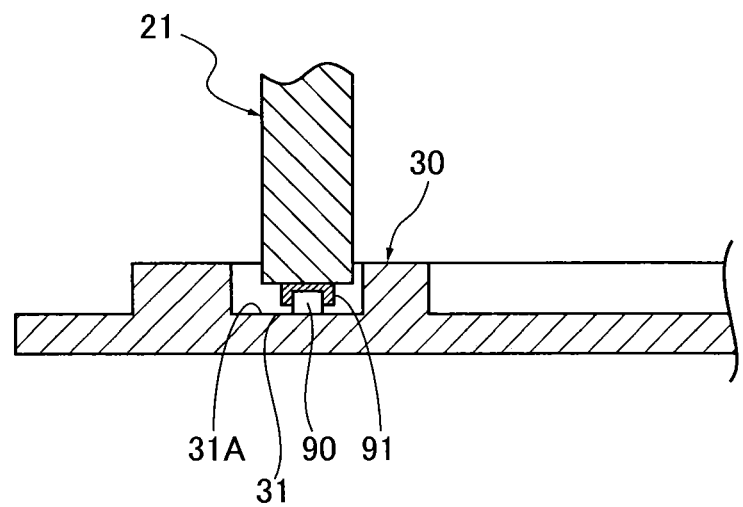
FIG. 14 is an explanatory view showing a configuration of other example of first and second positioners.
Figure 15:
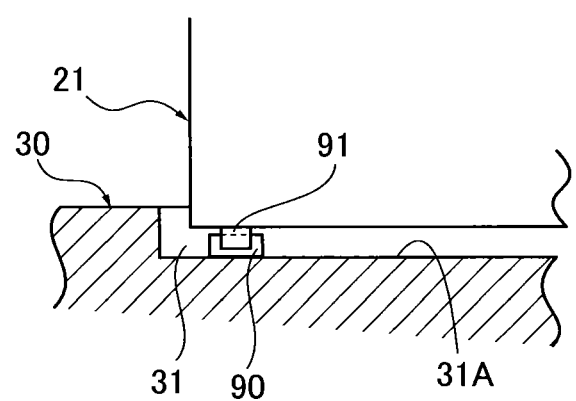
FIG. 15 is an explanatory view with a part sectioned, showing the configuration of the other example of the first and second positioners.

In addition, in the aforementioned embodiments, although the first positioner 200 is composed of the first hole 24 and the first boss 32 inserted in the first hole and the second positioner 210 is composed of the second holes 26, 27 and the second bosses 33 and 34 inserted in the second holes 26, 27, respectively, the first and second positioners 200, 210 are not limited to these structures. For example, as shown in FIG. 14, first and second positioners 200, 210 may be configured by providing a guide rail 90 on the bottom plate 30 and a guide member 91 provided on the holding member 21 to engage with the guide rail 90. In this case, the guide member 91 is configured to relatively move along the guide rail 90. Note that the guide rail 90 may be provided on the holding member 21 and the guide member 91 may be provided on the bottom plate 30.

Furthermore, in the aforementioned embodiments, although the pair of cameras 50, 51 is provided on the holding member 21, three or more cameras may be provided without being limited to the embodiments.

Although the several embodiments of the present invention have been described, it should be noted that the present invention is not limited to these embodiments, various modifications and changes can be made to the embodiments by those skilled in the art as long as such modifications and changes are within the scope of the present invention as defined by the Claims.

What is claimed is:

1. A camera device comprising:
    a holding member that holds a plurality of cameras to be arranged side by side;
    a supporting member that supports the holding member;
    a first positioner that positions the holding member to the supporting member in an arranged direction of the cameras; and
    a second positioner that positions the holding member to the supporting member in optical axis directions of the cameras, the second positioner being movable in the arranged direction of the cameras,
    wherein the first positioner and the second positioner are arranged in the arranged direction of the cameras.

2. The camera device according to claim 1, wherein the holding member is formed to extend long in the arranged direction of the cameras,
    the first positioner is disposed at a central portion of the holding member,
    the second positioner is disposed at both ends of the holding member, and
    the first positioner is configured to move the holding member relative to the supporting member in the optical axis directions.

3. The camera device according to claim 1, wherein the first positioner includes a first boss provided on one of joint surfaces in which the holding member and the supporting member are jointed and a first hole in which the first boss is inserted and which is provided in the other joint surface,
    the second positioner includes a second boss provided on the one joint surface and a second hole in which the second boss is inserted and which is provided in the other joint surface, and
    the second hole is a long hole having a long diameter in the arranged direction.

4. The camera device according to claim 2, wherein the first positioner includes a first boss provided on one of joint surfaces in which the holding member and the supporting member are jointed and a first hole in which the first boss is inserted and which is provided in the other joint surface,
    the second positioner includes a second boss provided on the one joint surface and a second hole in which the second boss is inserted and which is provided in the other joint surface,
    the first hole is a long hole having a long diameter in a direction parallel to the optical axes of the cameras, and
    the second hole is a long hole having a long diameter in the arranged direction.

5. The camera device according to claim 4, wherein the first boss and the second boss are provided on the joint surface of the supporting member and the first hole and the second hole are provided in the joint surface of the holding member.

6. The camera device according to claim 5, wherein the long hole of the second hole is formed by opening an end surface of the holding member.

7. The camera device according to claim 4, wherein the holding member is fastened to the supporting member at a position close to the first boss by a fastening member.

8. The camera device according to claim 1, wherein the holding member is provided in a casing,
    the supporting member constitutes a part of the casing,
    both end portions of the holding member do not come in contact with both side wall surfaces of the casing, and
    the holding member does not come in contact with a cover portion of the casing provided to face the supporting member.

9. The camera device according to claim 4, wherein only a central portion of a joint surface of the holding member is in contact with the supporting member.

10. The camera device according to claim 1, wherein the first positioner includes a first boss provided on one of joint surfaces in which the holding member and the supporting member are jointed and a first hole in which the first boss is inserted and which is provided in the other joint surface, and the second positioner includes a second boss provided on the one joint surface and a second hole in which the second boss is inserted and which is provided in the other joint surface, wherein the first hole is a long hole having a long diameter in a direction parallel to the optical axes of the cameras, and the second hole is a long hole having a long diameter in the arranged direction, and wherein the first boss and the second boss are provided on the joint surface of the supporting member and the first hole and the second hole are provided in the joint surface of the holding member, wherein the holding member is fastened to the supporting member at a position close to the first boss by a fastening member.

11. The camera device according to claim 1, wherein the first positioner includes a first boss provided on one of joint surfaces in which the holding member and the supporting member are jointed and a first hole in which the first boss is inserted and which is provided in the other joint surface, and the second positioner includes a second boss provided on the one joint surface and a second hole in which the second boss is inserted and which is provided in the other joint surface, wherein the first hole is a long hole having a long diameter in a direction parallel to the optical axes of the cameras, and the second hole is a long hole having a long diameter in the arranged direction, and wherein the first boss and the second boss are provided on the joint surface of the supporting member and the first hole and the second hole are provided in the joint surface of the holding member, wherein the long hole of the second hole is formed by opening an end surface of the holding member, wherein the holding member is fastened to the supporting member at a position close to the first boss by a fastening member.

12. The camera device according to claim 1, wherein the first positioner includes a first boss provided on one of joint surfaces in which the holding member and the supporting member are jointed and a first hole in which the first boss is inserted and which is provided in the other joint surface, and the second positioner includes a second boss provided on the one joint surface and a second hole in which the second boss is inserted and which is provided in the other joint surface, wherein the first hole is a long hole having a long diameter in a direction parallel to the optical axes of the cameras, and the second hole is a long hole having a long diameter in the arranged direction, and wherein the first boss and the second boss are provided on the joint surface of the supporting member and the first hole and the second hole are provided in the joint surface of the holding member, wherein only a central portion of a joint surface of the holding member is in contact with the supporting member.

13. The camera device according to claim 1, wherein the first positioner includes a first boss provided on one of joint surfaces in which the holding member and the supporting member are jointed and a first hole in which the first boss is inserted and which is provided in the other joint surface, and the second positioner includes a second boss provided on the one joint surface and a second hole in which the second boss is inserted and which is provided in the other joint surface, wherein the first hole is a long hole having a long diameter in a direction parallel to the optical axes of the cameras, and the second hole is a long hole having a long diameter in the arranged direction, and wherein the first boss and the second boss are provided on the joint surface of the supporting member and the first hole and the second hole are provided in the joint surface of the holding member, wherein the long hole of the second hole is formed by opening an end surface of the holding member, wherein only a central portion of a joint surface of the holding member is in contact with the supporting member.

14. The camera device according to claim 1, wherein the first positioner includes a first boss provided on one of joint surfaces in which the holding member and the supporting member are jointed and a first hole in which the first boss is inserted and which is provided in the other joint surface, and the second positioner includes a second boss provided on the one joint surface and a second hole in which the second boss is inserted and which is provided in the other joint surface, wherein the first hole is a long hole having a long diameter in a direction parallel to the optical axes of the cameras, and the second hole is a long hole having a long diameter in the arranged direction, and wherein the first boss and the second boss are provided on the joint surface of the supporting member and the first hole and the second hole are provided in the joint surface of the holding member, wherein the long hole of the second hole is formed by opening an end surface of the holding member, wherein the holding member is fastened to the supporting member at a position close to the first boss by a fastening member, wherein only a central portion of a joint surface of the holding member is in contact with the supporting member.

15. The camera device according to claim 1, wherein the first positioner includes a first boss provided on one of joint surfaces in which the holding member and the supporting member are jointed and a first hole in which the first boss is inserted and which is provided in the other joint surface, and the second positioner includes a second boss provided on the one joint surface and a second hole in which the second boss is inserted and which is provided in the other joint surface, wherein the first hole is a long hole having a long diameter in a direction parallel to the optical axes of the cameras, and the second hole is a long hole having a long diameter in the arranged direction, and wherein the first boss and the second boss are provided on the joint surface of the supporting member and the first hole and the second hole are provided in the joint surface of the holding member, wherein the long hole of the second hole is formed by opening an end surface of the holding member, wherein the holding member is fastened to the supporting member at a position close to the first boss by a fastening member,
wherein the holding member is provided in a casing,
the supporting member constitutes a part of the casing,
both end portions of the holding member do not come in contact with both side wall surfaces of the casing, and
the holding member does not come in contact with a cover portion of the casing provided to face the supporting member
wherein only a central portion of a joint surface of the holding member is in contact with the supporting member.

\* \* \* \* \*